(12) United States Patent
Campbell

(10) Patent No.: US 6,453,029 B1
(45) Date of Patent: Sep. 17, 2002

(54) DEBIT CARD SYSTEM WITHOUT CENTRALIZED SERVER

(75) Inventor: James A. Campbell, Plano, TX (US)

(73) Assignee: InterVoice Limited Partnership, Reno, NV (US)

( * ) Notice: Subject to any disclaimer, the term of this patent is extended or adjusted under 35 U.S.C. 154(b) by 0 days.

(21) Appl. No.: 09/081,482

(22) Filed: May 18, 1998

(51) Int. Cl.[7] .............................................. H04M 15/00
(52) U.S. Cl. ............................. 379/114.2; 379/114.17; 455/433; 455/406
(58) Field of Search .................................. 375/112, 114, 375/115, 121, 127, 144; 455/406, 407, 408, 432, 433, 439, 436, 438; 379/114.19, 114.2, 114.15, 114.17

(56) References Cited

U.S. PATENT DOCUMENTS

| | | | | |
|---|---|---|---|---|
| 5,008,929 A | * | 4/1991 | Olsen et al. ............... | 379/115 |
| 5,265,155 A | * | 11/1993 | Castro ......................... | 379/112 |
| 5,487,107 A | * | 1/1996 | Atkins et al. ............... | 379/144 |
| 5,497,412 A | * | 3/1996 | Lannen et al. .............. | 455/408 |
| 5,592,535 A | * | 1/1997 | Klotz .......................... | 379/114 |
| 5,621,787 A | * | 4/1997 | McKoy et al. .............. | 379/112 |
| 5,719,926 A | * | 2/1998 | Hill ............................. | 379/144 |
| 5,825,857 A | * | 10/1998 | Reto et al. .................. | 379/114 |
| 5,828,740 A | * | 10/1998 | Khuc et al. ................. | 379/144 |
| 6,036,090 A | * | 3/2000 | Rahman et al. ............. | 455/407 |
| 6,047,179 A | * | 4/2000 | Kirby ......................... | 455/432 |

* cited by examiner

Primary Examiner—Rexford Barnie
(74) Attorney, Agent, or Firm—Fulbright & Jarworski L.L.P.

(57) ABSTRACT

A system and method having a number of call processors and servers which provide prepaid or debit card calling service to local areas is disclosed. The servers are linked via a wide area network (WAN) or some other communications network. The system maintains a single account record for each debit card customer. Each account record contains information such as an account balance and a rate billing plan for the customer. When a customer makes a prepaid call, a local call processor and server handle the call. The local server obtains the customer's record from another server via the WAN if the record is not already present in a local database. WAN traffic is reduced because most debit card users routinely call from the same local area and, as a result, most of calls from a particular customer are processed by the same local call processor and server.

27 Claims, 2 Drawing Sheets

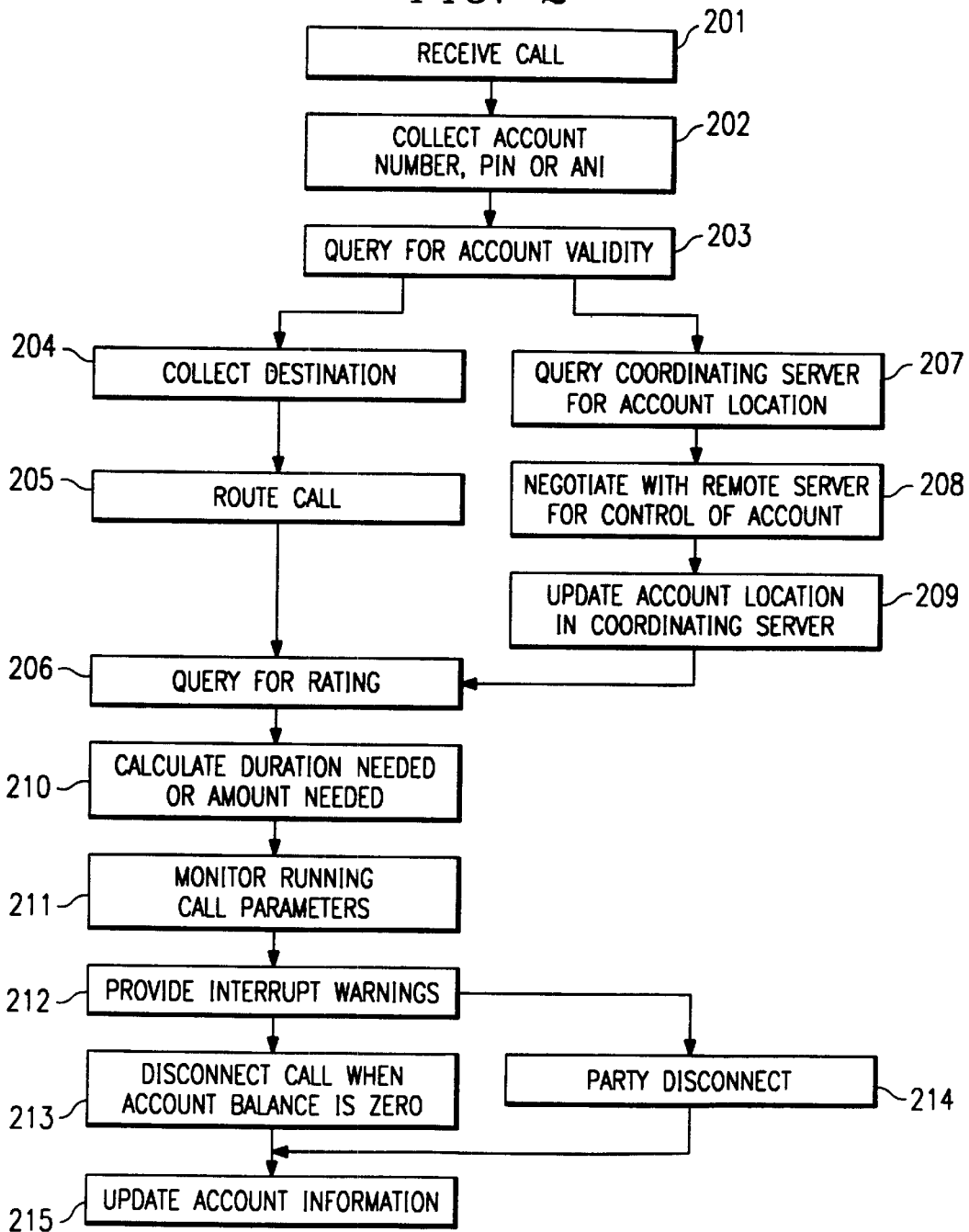

DEBIT CARD SYSTEM WITHOUT CENTRALIZED SERVER

TECHNICAL FIELD OF THE INVENTION

The invention relates generally to telecommunication systems, and more particularly to the use of debit cards in a system that does not require a centralized server for customer accounts.

BACKGROUND OF THE INVENTION

A debit card or prepaid calling system allows callers to charge telephone call costs against a prepaid amount that has been deposited by the callers. Prepaid calling systems can be used in both wireline and wireless telecommunications systems. Typically, users deposit a prepaid amount in an account that has been established with a debit card calling service provider. Debit card calls that are made through the service provider's system are charged against the user's prepaid account balance. Service providers can determine the cost for a particular debit card call in a number of ways. For example, users may be charged at a flat per-minute rate which essentially gives users a set number of calling minutes based upon the amount of money in the prepaid account. In a flat rate system, all calls to any telecommunications destination are billed at the same rate without regard to distance. Also, service providers can set a variable billing rate in which rates are based upon the distance of the calling destination.

The users' prepaid amounts are usually stored in a single centralized server or database. This central unit holds account information for every prepaid customer in the system. The user account records typically comprise such information as a current prepaid balance, an account number, a personal identification number (PIN) or password, and the user's billing rate plan.

Callers can access the debit card calling system in a variety of ways. In some systems users must first call a dedicated routing number. This number routes them to the centralized server which then prompts the callers to provide additional information such as an account number, PIN or destination telephone number. In other systems, users directly dial a destination telephone number and the call charges are billed to a prepaid account that is associated with the device from which the call originates, such as a particular business or residential telephone or a wireless device.

The prior art prepaid calling systems either route all calls through a central server or use a central server for maintaining customer account records. The use of a central database creates problems in the prior art systems by providing a single point of failure. If the central database or server fails, then the entire network will fail since customer accounts can no longer be accessed to verify accounts or to debit account balances.

Another problem with prior art debit card calling systems is the call volume. Since all of the prepaid calls must go through the central server, or at least access the central server for the customer records, this creates a heavy demand on the central database. The high demand levels create the need for a very fast database server at the central location that can service all of the calls in the system.

SUMMARY OF THE INVENTION

The problems of the prior art debit card calling systems are solved by a system and method in which database servers and call processors are distributed to a number of remote locations. Instead of routing all of the users through a central system, in the present invention the prepaid callers are serviced by local call processors that are coupled to the remote servers. The use of local call processors at the remote locations reduces the call volume that is handled by each call processor and server. As a result, the demand levels on each call processor and server are reduced. Thus, the present system works faster and more efficiently.

Each remote server in this decentralized system, is linked via a wide area network (WAN) or other data communications network which allows the servers to exchange user account information. The present invention maintains a single database record for each user, however the account records do not have to be stored on a central server. Instead, user account records are distributed among the various remote servers so that each customer's record is resident on the server that serves the customer's home location or on the server that was last used by the caller.

Debit card calls are routed through the local call processor, which exchanges data with the local server. The call processor and the server verify that the user has a valid prepaid account and begin calculating charges for the call. The local server will either have the user's record resident in a local database or it will obtain the record from another server via the WAN. The call processor continues to route the call while the server obtains and verifies the user's account balance. If the user's balance is zero or below a minimum amount, then the call will be terminated. Otherwise, if there is a sufficient account balance the call processor and server monitor the running charges for the call and deduct the costs from the account balance.

Prepaid calls are terminated by the parties when they hang up or by the call processor when the debit card balance falls below a minimum amount. Using the account balance and the billing rate for a particular call, the call processor and server can calculate how much connection time remains before the account balance falls to the minimum level. The call processor may provide the customer with periodic time remaining warnings when the account balance approaches a minimum amount.

After the connection is disconnected the user's account record will be updated on the local server. The account remains on the local server until it is required for a future call. In most cases the debit card customer will call from the same area, so his or her future calls will be routed through the same home location call processor. As a result, the customer's record will usually be readily available. However, if the customer travels to another area or if more than one person uses the same account, then a future prepaid call may be routed through a second call processor. In this situation, a second server will require the prepaid caller's record in order to handle the call. Accordingly, the second server will request access to the customer's account from home server or from whichever server currently holds the account. As long as the account is not in use, the home server will provide the account record to the second server.

In one embodiment, a coordinating server is used in the debit card calling system to track the location of each user record. Whenever a record is transferred from one server to another, the record location is updated in the coordinating server. In another embodiment, if there are few remote servers, instead of using a coordinating server, each remote server can poll the other servers to determine the location of a particular customer record.

By only allowing one copy of a customer record to exist, the present system can prevent fraud by limiting access to customer accounts to only one server at a time if desired. Thus, only one caller at a time may use each account. This prevents two or more callers in separate areas from making charges against the same account balance simultaneously. If a caller attempts to use a prepaid account that is already in use, then the system may terminate the second caller's connection.

WAN traffic is also reduced in the present system since most debit card users will usually call from one area. As a result the user's record will always be available on the local or last-used server. User account transfers on the WAN will have to be made only when the customer changes locations between calls. In prior art systems, the customer's record must be obtained via the WAN from a central location for each call.

It is a feature of the present invention to reduce network traffic in a debit card calling system by storing customer accounts in a server at a home or a last-used location. Other servers in a second location can obtain a particular customer record via the WAN when the customer initiates a call from the second area.

It is an another feature of the present invention to reduce delays in connecting prepaid callers to called destinations, by allowing debit card calls to be routed concurrently with verification of the prepaid user's account information. In the event that the present system determines that a prepaid account has a zero balance or insufficient funds for a particular call, the system is capable of terminating a completed calling connection.

It is a further feature of the present invention to reduce telecommunications system failures, crashes and down time by eliminating the single point of failure problems of the prior art. By assuming that callers will typically make a series of calls from one location, network traffic in the system is reduced by storing user call records at the location most likely to be used by each debit card caller for a future call.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 2 is a flow chart of the operation of the system shown in FIG. 1.

DESCRIPTION OF THE PREFERRED EMBODIMENTS

Figure 1:
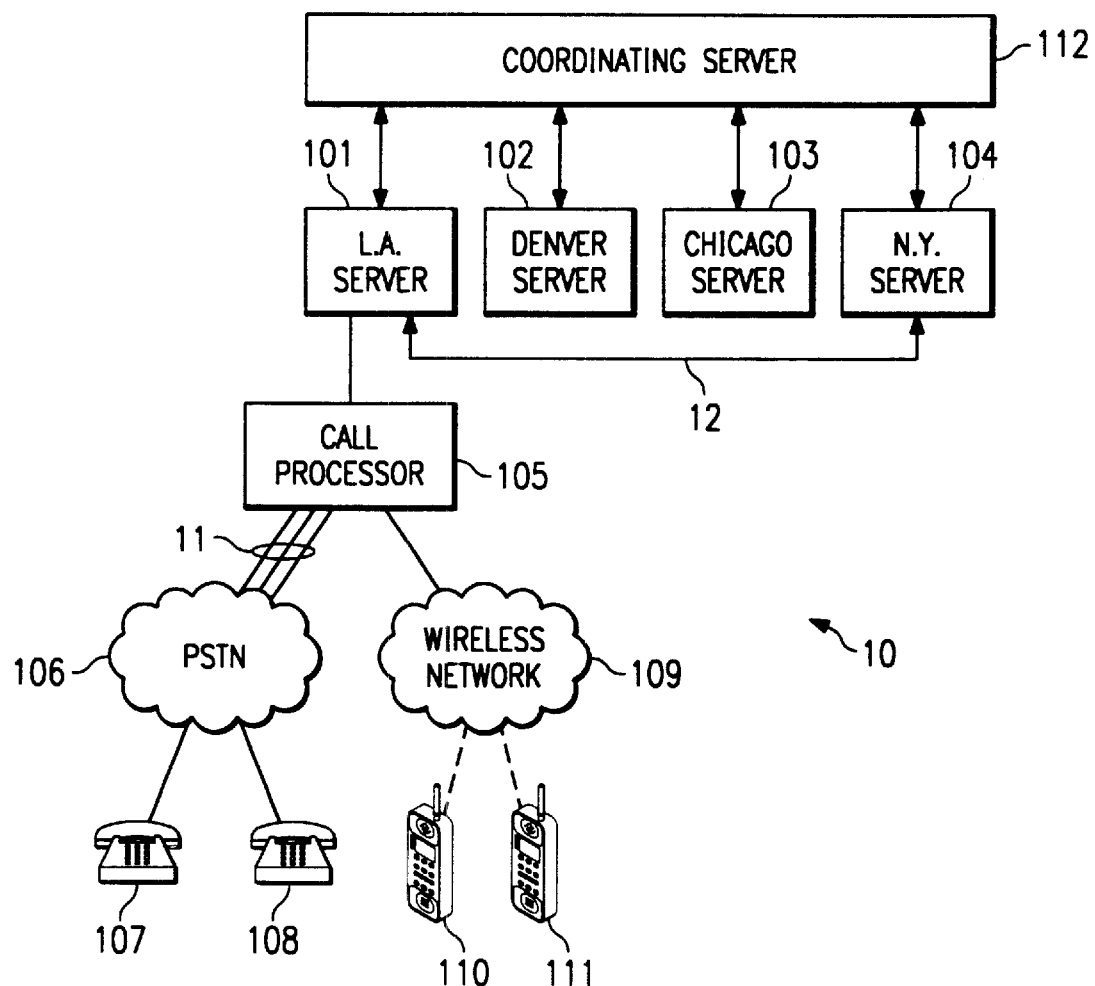
FIG. 1 is a high level block diagram of a system incorporating the present invention.

FIG. 1 illustrates telecommunications system 10 which provides calling services, such as prepaid calling, voice mail, automated customer service, or international call back services, to telephone users. System 10 is comprised of a number of servers 101–104 that are distributed over a wide geographic area, For example, in FIG. 1, server 101 is located in Los Angeles, server 102 is located in Denver, server 103 is located in Chicago and server 104 is located in New York. Each server 101–104 is connected to a local call processor, such as call processor 105, which handles users' calls in each local area. Server 101 provides information to call processor 105, such as data required to run a particular application or customer account information.

Callers, such as users 107 and 108, connect to call processor 105 through public switched telephone network (PSTN) 106. Lines 11 may be telephone trunk lines or any other well-known telecommunications connection that functions as a link between call processor 105 and PSTN 106. Call processor 105 is capable of selectively routing and connecting inbound and outbound calls in order to allow callers, such as user 107, to contact a called party, such as user 108. Alternatively, call processor 105 may be connected to wireless network 109. In a wireless telecommunications environment, call processor 105 is capable of providing calling services for wireless customers, such as users 110 and 111.

Call processor 105 and server 101 may be separate devices which cooperatively interact to provide calling services or they may be embodied in a single local system. Depending upon the desired application and the particular telecommunications system, call processor 105 and/or server 101 may be part of a service control point (SCP), service node (SN), intelligent peripheral (IP) or mobile switching center (MSC).

Call processor 105 is capable of performing any number of call processing services. The operation of system 10 will be described using the example of debit card calling or prepaid calling services. In order to use the prepaid calling service, user 107 typically will dial a routing telephone number, such as a specific "1-800", "1-888" or "10XXX" number for the service provider. PSTN 106 routes the call to local call processor 105 for handling. User 107 provides call processor 105 with identification information, such as a account number or personal identification number (PIN), and with a telecommunications destination, such as a telephone number for users 108 or 111.

Call processor 105 also can obtain caller identification information from user 107 via automatic number identification (ANI). For example, if multiple callers used the same prepaid account, such as a business account, then the callers could all use the same ANI number and the system would identify the account from the PIN information. In wireless network 109, user 110 does not need to dial a special routing number. Instead, user 110 would dial the number of a desired telecommunications destination and call processor 105 would identify the caller, and the appropriate account, using the mobile identification number (MIN) for wireless device 110.

In addition to obtaining identifying information from callers 107 or 110, call processor 105 requires information from system 10, such as a list of valid customer accounts or specific information for a particular account. Servers 101–104 store account information for each debit card user. The account information may comprise such data as an identification code, a PIN, an account balance and a specified rate plan. The rate plan may be a flat rate, or a fixed charge that is billed for each minute that the caller and the calling party are connected, without regard for the distance of the connection. Alternatively, a variable rate plan may be used so that the billed amount is determined by factors such as the time of the call and distance of the called destination.

In system 10, account information for a particular user is maintained by only one server 101–104 at any point in time. By limiting control of user accounts to only one server, system 10 is able to reduce network traffic and prevent fraud. Network traffic is reduced in system 10 because account information needs to be updated only in server 101, instead of requiring updates to duplicate accounts in every server 101–104. The capability of maintaining a single current account record prevents fraud because only one server can control the account information at one time. If user 107 is being serviced by call processor 105, then user 107's account will be active in server 101. Thus, server 101 will recognize that an attempt by caller 108 to use caller 107's account is invalid. Likewise, if another server 102–104 requests access to user 107's account while the account is active on server 101, then system 10 will detect and prevent the unauthorized use of caller 107's prepaid balance by a caller in another area.

If user 107 (or 110) is in Los Angeles, then call processor 105 will receive his or her incoming debit card calls for processing. Processor 105 gathers information from caller 107 and requests account information from local server 101. If user 107's last debit card call was made in the Los Angeles area, then his or her account information will typically be readily available on server 101 for use by call processor 105. If user 107's last prepaid call was initiated in a different location, such as when he or she was in New York, then the account record will be resident on a remote server, such as server 104 in New York.

In this situation, when a local server does not have control of a user's account information, server 101 must determine which other server 102–104 has control of user 107's account. If there are a large number of servers in system 10, then a coordinating server, such as server 112, may be used to track the location of each account record. When local server 101 requires a particular account record, server 101 can use network connection 13 to query coordinating server 112 as to the location of that particular account. Coordinating server 112 will respond with the account's location, such as on server 104. Then, server 101 can directly request server 104 to transfer the account via line 12 which may be a network connection or any data connection which allows servers 101 and 104 to exchange queries, messages or data for user accounts. When an account is transferred from one server to another, each server involved in the transfer can update the account location in coordinating server 112 via lines 13. Alternatively, if there are a few servers in system 10, then each server may be interconnected (not shown) and requesting server 101 can poll, or broadcast to, each of the other servers 102–104 to determine which server holds the desired account.

In the present example, after server 101 locates user 107's account on server 104, then server 101 will request server 104 to transfer user 107's account information. Unless the account is active for a caller in New York, server 104 will transfer control of the account to server 101 over connection 12. Typically, while server 101 is negotiating for control of the account information, call processor 105 continues to route user 107's call.

Once server 101 obtains the desired account record, then call processor 105 determines the current account balance to ensure that there is a positive balance against which the call costs can be charged. Call processor 105 also determines which rate plan applies to caller 107. Once caller 107 and called party 108 are connected, call processor 105 begins calculating the call charges based upon the appropriate rate plan. Call processor 105 subtracts the running cost of the connection from user 107's account balance. At predetermined intervals call processor 105 provides warnings to caller 107 regarding the amount of time remaining based upon the current adjusted account balance. For example, when the account balance is approaching zero, call processor 105 may provide a five or ten minutes remaining warning and/or a countdown of the last few minutes before termination of the connection. If the account balance does reach zero, or some other minimum amount, which may be a negative value, then call processor 105 will give a final warning and break the connection between users 107 and 108. On the other hand, users 107 and 108 may finish their communication and disconnect from call processor 105 with a positive balance remaining in user 107's account. Once the connection is terminated, server 101 updates the account balance in user 107's record. User 107's account record is then available for use by servers 101–104 for future calls.

FIG. 2 is a flowchart that illustrates the steps followed by call processor 105 and server 101 during a prepaid communication in system 10. Call processor 105 receives an incoming call from PSTN 106 or wireless network 109 in step 201. Next (step 202) call processor 105 collects identifying information about the incoming call, such as ANI, MIN or DNIS data from networks 106 and 109 or account number and PIN information from the caller. Callers can input account number information via dual tone multi frequency (DTMF) signals that are entered on a telephone or wireless device keypad or via spoken messages.

In step 203 call processor 105 queries server 101 whether a valid prepaid account was identified in step 202. Call processor 105 provides an account identifier to server 101 which then determines whether such an account is active on system 10. System 10 may provide for validating accounts by providing a list of assigned account numbers on each server 101–104. For example, the list could be updated every time a new prepaid account was opened or a new calling card was issued. The purpose of the valid account list is merely to verify that the caller actually has an account before call processor 105 begins to route the call. The list of valid account numbers or calling card numbers would not have to contain information such as the current prepaid balance. Instead, specific account information is held in a separate file on only one server.

It will be understood in FIG. 2 that the steps may be rearranged for various embodiments of system 10. Furthermore, two or more steps may be performed concurrently as shown by steps 204–206 and steps 207–209. In step 203, server 101 validates the caller's account to call processor 105 and then determines whether it has control of that account. As discussed in detail below, if server 101 does not have control of the account, then it performs steps 207–209 in order to gain control of the account. For efficiency purposes, regardless of whether server 101 has control of the caller's account, call processor 105 continues to process the call in steps 204 to 206.

Call processor 105 collects destination information in step 204. This information may be entered by the caller to initiate the call or system 10 can prompt the user for the information. For example, a wireless prepaid calling user would simply dial a destination number. On the other hand, in some systems, wireline user 107 may have to dial an initial routing number, such as a "1-800" number, and the system would then prompt the caller for additional account information.

Upon obtaining destination information and a valid account number, call processor 105 begins routing the call in step 205. In step 206 call processor 105 queries server 101 for the rating method that is to be used in calculating the caller's charges. In order to respond to the rating query, server 101 must have access to the caller's account.

As discussed above, in step 203 server 101 determines whether the caller's account is resident locally or whether some other server 102–104 has control of the account. If the account is held by a remote server 102–104, then server 101 performs steps 207—209. In step 207 server 101 queries coordinating server 112 as to the current location of the caller's account. In response server 112 provides server 101 with the account's location, for example on server 104. In step 208, server 101 contacts server 104 directly, such as via link 12, and requests access to the account.

If the requested account is in active use on server 104, that will be an indication to system 10 of potential fraudulent use and server 104 may deny access to server 101. In turn, server 101 will notify call processor 105 that the account identified by the caller is active on another server and call processor 105 may terminate the call. Alternatively, if the requested account is not active on server 104, then server 104 will transfer the account to server 101 via link 12. After the account has been transferred, servers 101 and 104 inform coordinating server 112 of the updated account location in step 209.

Returning to step 206, once server 101 has access to the caller's account it responds to the rating query from call processor 105 by indicating whether the call should be charged on a fixed or variable rate. In step 210 call processor 105 calculates a minimum call duration or call charge for the specific connection dialed based upon the caller's rate plan. Processor 105 and server 101 then determine whether the caller's account balance is above the minimum amount. If the account balance is above the minimum level, the connection will be maintained, otherwise, call processor will terminate the connection if the balance is below the calculated minimum charge.

In step 211 call processor 105 monitors the running charges for the Hecall and deducts the amount from the initial account balance. Periodically, in step 212, call processor 105 provides warnings to the caller as to the call duration remaining. For example, based upon the account balance, the rating plan and the type of connection, call processor 105 can convert the account balance into a certain number of minutes for a specific connection. Then, by subtracting the elapsed time from the initial balance, call processor can calculate how many minutes remain. At predetermined intervals, such as when there are ten or five minutes remaining, call processor 105 plays an audible warning to the caller.

If the caller continues to communicate, then the connection is terminated when call processor 105 and server 101 calculate that the running account balance has gone to zero (step 213). On the other hand, the caller or called party may terminate the connection before the balance reaches zero (step 214). In either situation, following termination, call processor 105 updates the account record in server 101 as shown in step 215. Once the account balance is updated in the record, then server 101 will maintain control of the record until the caller initiates another call through call processor 105 or until another server 102–104 requests access to the account.

Although the present invention and its advantages have been described in detail, it should be understood that various changes, substitutions and alterations can be made herein without departing from the spirit and scope of the invention as defined by the appended claims.

What is claimed is:

1. A method for providing user information in a telecommunications system comprising a plurality of servers, each of said servers at a different location and linked by a data network, said method comprising the steps of:

determining whether said user information is in a local server;

identifying a remote server having said user information, when said user information is not in said local server;

negotiating with said remote server to obtain control of said user information, wherein said user information is transferred from said remote server to said local server, and wherein said transfer of said user information includes removing said user information from said remote server such that said user information resides only at said local server;

calculating a call charge amount allowed using said information; and maintaining said user information on said local server until such time as a remote server of said plurality of servers negotiates with said local server to transfer and obtain control of said user information.

2. The method of claim 1 further comprising the step of:

routing a user's call to a telecommunications destination concurrently with said determining, identifying and negotiating steps.

3. The method of claim 1 wherein each of said plurality of servers are linked by a wide area network (WAN).

4. The method of claim 1 wherein said identifying step further comprises the step of:

querying a coordinating server as to the location of a particular user record.

5. The method of claim 1 wherein said identifying step further comprises the step of:

polling other remote severs of said plurality of servers as to the location of a particular user record.

6. The method of claim 1 wherein said user information comprises prepaid calling services information.

7. The method of claim 6 wherein said prepaid calling services information includes data selected from the group consisting of:

billing rate data;

account balance data; and password data.

8. A system for providing debit card calling services to users comprising:

a plurality of processor means for routing calls to called destinations using information provided by said users;

network means for linking said plurality of processor means;

a plurality of user records distributed among said processor means, said user records comprising debit card account information for each of said users;

means for calculating a debit card call charged amount using said user records; and means for transferring said user records among said processor means via said network means, wherein the transfer of one of said user records from one of said processor means to another of said processor means comprises removal of said one of said user records from said one of said processor means such that said one of said user records resides only at said another of said processor means.

9. The system of claim 8 further comprising:
coordinating means for monitoring the location of each of said plurality of user records.

10. The system of claim 8 further comprising:
means for polling each of said processor means to determine whether one of said processors controls a particular user record.

11. The system of claim 8 wherein said remote processors comprise a device selected from the group consisting of:
a service control point;
a service node;
an intelligent peripheral; and
a mobile switching center.

12. The system of claim 8 further comprising:
means for monitoring said current debit card balance in real time.

13. The system of claim 12 further comprising:
means for determining a time remaining period based upon said current debit card balance.

14. The system of claim 13 further comprising:
means for notifying said users of said time remaining period at predetermined intervals.

15. The system of claim 12 further comprising:
means for terminating a debit card call connection when said current debit card balance is below a predetermined minimum amount.

16. The method of claim 1 wherein current user information for a user resides on only one of said plurality of servers at any given time.

17. The system of claim 8 further comprising:
means for maintaining a user record for a user on said processor means to which said user record is transferred until such time as another of said plurality of processor means requests receipt of said user record.

18. The system of claim 8 further comprising:
means for maintaining one or more of said user records local to one of said plurality of processor means until a remote one of said plurality of processor means requests that said one or more of said user records be transferred to said remote one of said plurality of processor means.

19. A local call processing system for providing debit card calling services to users, said local call processing system comprising:
call processor means for routing calls from local users;
local server for maintaining user account information for said local users and for providing said user account information to said call processor means;
means for determining whether said user account information is in said local server;
communication link via data network to at least one remote server;
means for requesting to obtain control of said user account information when determined that said user account information is not in said local server, wherein said user account information is transferred from one of said at least one remote server to said local server via said data network such that current user account information is maintained only on one of said local server and said at least one remote server, and wherein said transfer of said user account information includes removing said user account information from said one of said at least one remote server such that said user account information resides only at said local server;
means for calculating a call charge amount allowed using said user account information; and
means for maintaining said user account information on said local server until such time as one of said at least one remote server requests to obtain control of said user account information.

20. The local call processing system of claim 19 further comprising:
means for identifying one of said at least one remote server having said user account information, when determined that said user account information is not in said local server.

21. The local call processing system of claim 20 wherein said means for identifying comprises:
means for querying a coordinating server means.

22. The local call processing system of claim 20 wherein said means for identifying comprises:
means for polling said one or more other local call processing systems.

23. The local call processing system of claim 19 further comprising:
means for communicating to said users through at least one of a wireline telephone network and a wireless communications network.

24. The local call processing system of claim 19 wherein said means for requesting to obtain control of said user account information further comprises means for negotiating with said one of said at least one remote servers to obtain control of said user account information, and wherein said means for maintaining maintains said user account information on said local server until such time as one of said at least one remote server negotiates with said local server to obtain control of said user account information.

25. The local call processing system of claim 19 further comprising:
means for monitoring a current debit card balance in real time.

26. The local call processing system of claim 25 further comprising:
means for terminating a debit card call connection when said current debit card balance is below a predetermined amount.

27. A local call processing system for providing debit card calling services to users, said local call processing system comprising:
call processor means for routing calls from local users;
local server for maintaining user account information for said local users and for providing said user account information to said call processor means;
means for determining whether said user account information is in said local server;
communication link via data network to at least one remote server;
means for requesting to obtain control of said user account information when determined that said user account information is not in said local server, wherein said user account information is transferred from one of said at least one remote server to said local server via said data network such that current user account information is maintained only on one of said local server and said at least one remote server, and wherein said requesting means further comprises means for negotiating with said one of said at least one remote servers to obtain control of said user account information;
means for calculating a call charge amount allowed using said user account information; and
means for maintaining said user account information on said local server until such time as one of said at least one remote server requests to obtain control of said user account information, wherein said maintaining means maintains said user account information on said local server until such time as one of said at least one remote server negotiates with said local server to obtain control of said user account information, and wherein said negotiating with said one of said at least one remote server includes ensuring that said user account is not in use at said one of said at least one remote server.

* * * * *

UNITED STATES PATENT AND TRADEMARK OFFICE
CERTIFICATE OF CORRECTION

PATENT NO. : 6,453,029 B1  
DATED : September 17, 2002  
INVENTOR(S) : James A. Campbell It is certified that error appears in the above-identified patent and that said Letters Patent is hereby corrected as shown below:

Title page,
Item [56], References Cited, include the following U.S. PATENT DOCUMENTS:
-- 5,298,403   02-15-1994   Atkins et al   379/144
   5,469,497   11-21-1995   Pierce et al   379/115 --

Column 7,
Line 41, delete "Hecall" and insert -- call -- therefor.

Signed and Sealed this

Eighteenth Day of February, 2003

JAMES E. ROGAN  
*Director of the United States Patent and Trademark Office*